No. 621,843. Patented Mar. 28, 1899.
J. McNAUGHTON.
NUT LOCK.
(Application filed Sept. 1, 1898.)

(No Model.)

WITNESSES:
James C. Herron
S. R. Bell

INVENTOR,
Jas. McNaughton
by J. Snowden Bell
Att'y.

THE NORRIS PETERS CO., PHOTO-LITHO., WASHINGTON, D. C.

UNITED STATES PATENT OFFICE.

JAMES McNAUGHTON, OF DUNKIRK, NEW YORK.

NUT-LOCK.

SPECIFICATION forming part of Letters Patent No. 621,843, dated March 28, 1899.

Application filed September 1, 1898. Serial No. 690,036. (No model.)

*To all whom it may concern:*

Be it known that I, JAMES McNAUGHTON, of Dunkirk, in the county of Chautauqua and State of New York, have invented a certain new and useful Improvement in Nut-Locks, of which improvement the following is a specification.

The object of my invention is to provide simple, efficient, and inexpensive means for locking a nut in desired position upon a bolt or threaded stem, to which end my invention, generally stated, consists in the combination of a threaded rod or stem perforated by a diametral pin-hole, main and lock nuts each engaging the thread of said stem and provided with radial recesses on their adjacent faces, and a locking-pin passing through the hole in the stem and engaging opposite pairs of recesses on the nuts.

The improvement claimed is hereinafter fully set forth.

Figure 1:
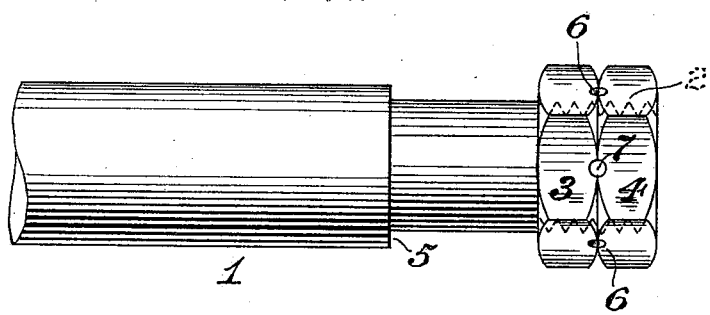
Figure 2:
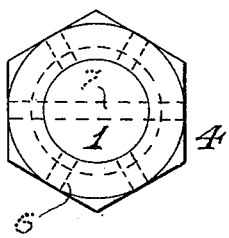
Figure 3:
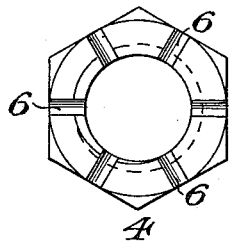

In the accompanying drawings, Figure 1 is a side view in elevation of a portion of a piston-rod with my invention applied thereto; Fig. 2, an end view as seen from the right, and Fig. 3 a view of the face of either of the nuts which abuts against the other nut.

In the practice of my invention the stem or rod 1 to which it is applied, which in this instance is indicated as an air-pump piston-rod, is provided with a screw-thread 2, extending inwardly from one of its ends sufficiently far to receive a main nut 3 and a lock-nut 4, which are provided for holding a piston-head to proper tight bearing against a shoulder 5 on the rod 1. Radial grooves or recesses 6, which are preferably semicircular in transverse section, are milled in one of the faces of each of the nuts 3 and 4, these faces being designed to be adjacent when the nuts are in position. A diametral pin-hole is drilled through the rod 1, with its axis in the plane of the meeting faces of the nuts 3 and 4 when the same are secured to the desired bearing, for the reception of a locking-pin 7, the diameter of which is such as to fit neatly within and engage with two opposite pairs of recesses 6 of the main and lock nuts.

The nuts are screwed on a mandrel and grooved with a milling-machine cutter, as the grooves or recesses 6 must be truly diametral to the thread. A suitable jig is employed in drilling the hole for the locking-pin 7, which, it will be readily seen, must be truly diametral to the rod and located at the proper distance from the shoulder 5 thereof to fit between the nuts 3 and 4 when screwed up to a proper bearing.

When the main nut 3 is screwed tightly against the piston-head or other member which is to be secured upon the rod 1 and the lock-nut 4 is set up against the main nut, the recesses in the adjacent faces of the nuts are brought into register and two opposite pairs are brought into line axially with the pin-hole of the rod. The locking-pin 7 is then inserted through the coincident pairs of recesses and the pin-hole and prevents either nut from turning upon the rod. The recesses being cut across from all sides of the nuts, only a slight movement is required to bring opposite pairs into line with the pin-hole.

I claim as my invention and desire to secure by Letters Patent—

The combination of a threaded rod or stem, main and lock nuts engaging the thread of said stem and provided with radial recesses on their adjacent faces, and a locking-pin passing through a diametral hole in the stem and engaging opposite pairs of recesses on the nuts.

JAMES McNAUGHTON.

Witnesses:
JNO. W. HOLMES,
J. C. WOLLENSAK.